United States Patent

[11] 3,615,839

| [72] | Inventors | Russell A. Thompson<br>Glastonbury;<br>Alexander H. Levy, Bloomfield, Conn.;<br>Eugene M. Hoyle, Santa Clara, Calif. |
|---|---|---|
| [21] | Appl. No. | 744,396 |
| [22] | Filed | July 12, 1968 |
| [45] | Patented | Oct. 26, 1971 |
| [73] | Assignee | United Aircraft Corporation<br>East Hartford, Conn. |

[54] FUEL CELL SYSTEM WITH RECYCLE STREAM
5 Claims, 1 Drawing Fig.

[52] U.S. Cl. ............................................. 136/86 C
[51] Int. Cl. ............................................. H01m 27/14
[50] Field of Search ................................. 136/86

[56] References Cited
UNITED STATES PATENTS

| 2,901,524 | 8/1959 | Gorin et al. | 136/86 |
| 3,002,039 | 9/1961 | Bacon | 136/86 |
| 3,180,762 | 4/1965 | Oswin | 136/86 |
| 3,266,938 | 8/1966 | Parker et al. | 136/86 |
| 3,288,647 | 11/1966 | Beigelman et al. | 136/86 |
| 3,297,483 | 1/1967 | McEvoy | 136/86 |
| 3,393,098 | 7/1968 | Hartner et al. | 136/86 |
| 3,436,271 | 4/1969 | Cole et al. | 136/86 |
| 3,453,146 | 7/1969 | Bawa et al. | 136/86 |
| 3,288,646 | 11/1966 | Soredal | 136/86 C |

FOREIGN PATENTS

| 769,133 | 10/1967 | Canada | 136/86 |

Primary Examiner—Allen B. Curtis
Attorney—Charles A. Warren

ABSTRACT: A high-temperature integrated fuel cell system with high overall thermal efficiency is achieved by utilizing fuel cell waste heat as the source of energy for the fuel-reforming process. A hydrocarbon fuel is mixed with a recycle stream containing water vapor and the mixture is introduced into the anode chamber of a high-temperature molten carbonate fuel cell. Within the anode chamber is a suitable catalyst which, with the addition of fuel cell waste heat, produces a hydrogen-rich stream. Hydrogen reacts electrochemically at the anode. The anode effluent essentially contains hydrogen, carbon dioxide, and steam. Carbon dioxide and a portion of the water is removed from the anode effluent and is transferred to the process air supply since a relatively high concentration of carbon dioxide is desirable at the cathode in the molten carbonate system. The remaining moist anode stream is recycled to be mixed with the fresh fuel.

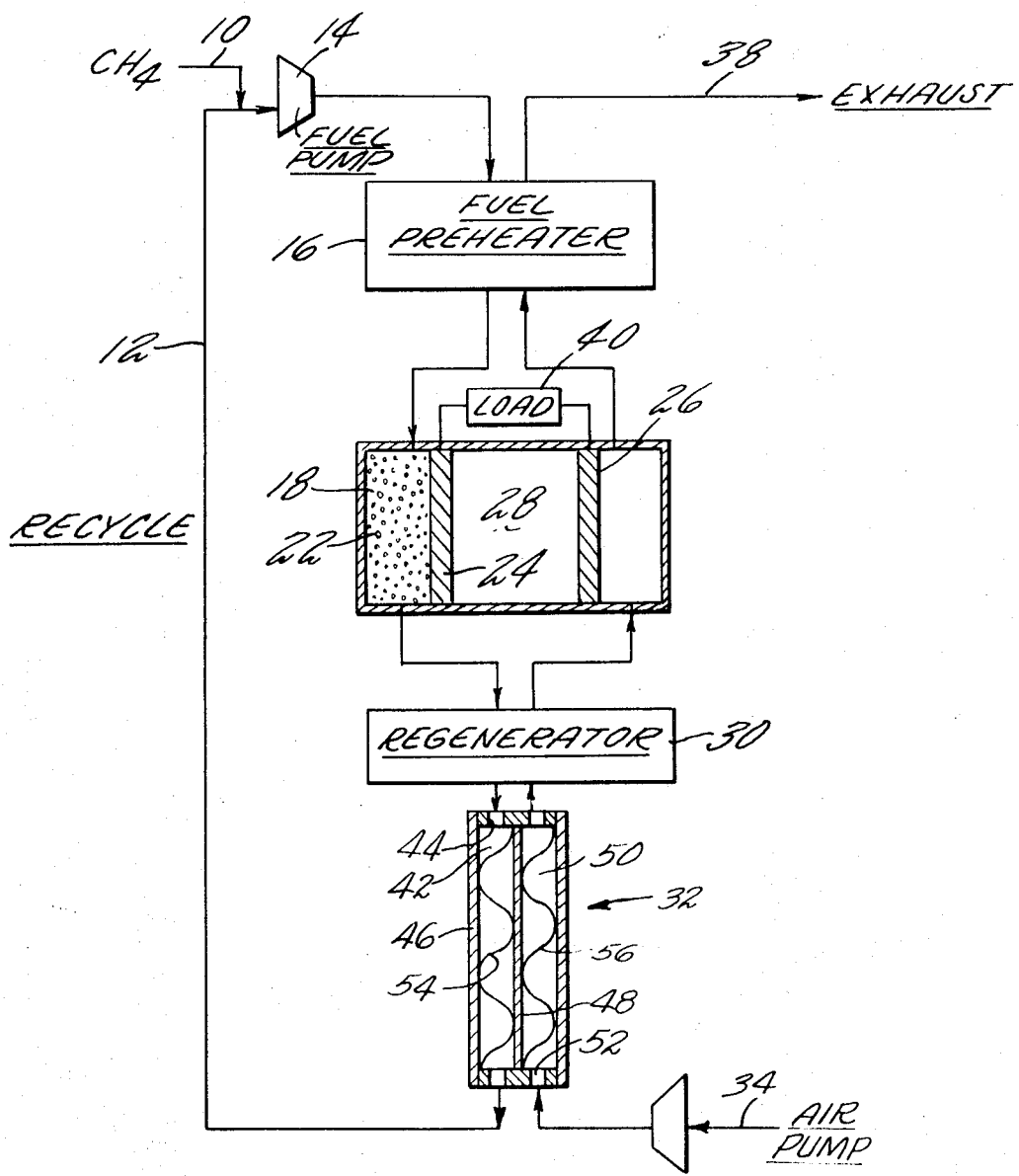
INVENTORS
ALEXANDER H. LEVY
RUSSELL A. THOMPSON
EUGENE M. HOYLE
BY Charles A. Warren
ATTORNEY

FUEL CELL SYSTEM WITH RECYCLE STREAM

BACKGROUND OF THE INVENTION

1. Field of Art

This invention relates to high-temperature fuel cells and in particular relates to the recycling of a portion of the moist anode effluent to provide the necessary steam for steam reforming of hydrocarbon fuel.

2. Description of the Prior Art

Conventional fuel cells which operate in the 100° to 500° F. range, offer an efficient method of converting chemical energy to electrical energy. Molten carbonate electrolyte fuel cells operate at high temperatures in the vicinity of 1,200° to 1,400° F. and are capable of operating with the use of inexpensive materials such as silver, nickel, and copper as electrode catalysts. The performance of molten carbonate fuel cells is not as high as base or acid cells. Since the operating temperature of molten carbonate cells is high, the product water is vaporized and water management within the electrolyte is not as critical as in the low-temperature base or acid cells. Provisions must be made to supply a relatively high concentration of carbon dioxide to the cathode and provisions must also be made to remove carbon dioxide from the fuel electrode. The molten carbonate system operates on reformed fuel directly and no palladium/silver separator or intermediate chemical reaction is required to purify the fuel supply. Since carbon dioxide must be supplied with the process air, the conventional reformer exhaust containing carbon dioxide is often mixed with the air supply. The molten carbonate electrolyte fuel cell may operate on a hydrocarbon fuel and air.

Typically in the molten carbonate system, water and natural gas fuel are mixed and channeled to a boiler where the liquid water is vaporized. After vaporization, the mixture continues to a reactor which generally operates at about 1,400° F. In the presence of a catalyst, the gaseous fuel is steam reformed to its individual constituents. Reformed fuel is then piped to the molten carbonate cell stack where approximately 70 percent of the incoming hydrogen is used in the reaction. The remaining hydrogen is consumed in the reformer where it provides sufficient heat to vaporize the water for steam reforming. The anode reaction produces water which is evaporated into the anode stream as a vapor. This vapor is the source of water for the reforming process. To reclaim the water, burner exhaust gases are cooled to approximately 140° F. where the water is condensed and stored for future use in the reformer.

The cathodic reaction requires a mole of carbon dioxide and a half-mole of oxygen for each mole of hydrogen converted at the anode. Process air has been mixed with the carbon dioxide rich burner exhaust stream to provide sufficient carbon dioxide for the cathode reaction.

In order to make the molten carbonate fuel cell more attractive, we have devised a simple, efficient and high-performance molten carbonate fuel cell system. This system has simplicity, as exemplified by the relatively small number of components. The condenser and boiler, which are characteristic of lower-temperature fuel cell systems have been eliminated. Relatively inexpensive catalysts can be used in this system. Further, the recycle of moist anode effluent increases hydrogen partial pressure in the anode compartment and supplies the steam necessary to steam reform the hydrocarbon fuel. Thus, this system provides an economically feasible, natural gas power plant which is capable of advantageous utilization in a wide number of commercial uses.

SUMMARY OF THE INVENTION

The object of the present invention is the provision of a molten carbonate electrolyte fuel cell system which obtains the steam necessary to steam reform a hydrocarbon fuel directly from the anode effluent.

Another object of this invention is the removal of the carbon dioxide and a portion of the steam from the fuel cell anode effluent so that the recycle stream is essentially hydrogen and steam which is mixed with the fuel feed and the steam is used in the steam reforming of additional fuel.

A further object of this invention is the utilization of the excess steam in the anode effluent to steam reform a hydrocarbon fuel without requiring the condensing and reboiling of product water for steam reforming.

A still further object of this invention is the provision of a molten carbonate electrolyte fuel cell system, wherein the hydrocarbon fuel is steam reformed in a catalyst-containing anode compartment, the steam being obtained from the anode effluent, and the necessary energy for reforming is provided by cell waste heat.

Other objects, features and advantages of the present invention will become more apparent from the following detailed description of a preferred embodiment thereof and from the accompanying drawing.

BRIEF DESCRIPTION OF THE DRAWING

The single FIGURE is a diagrammatic view of the system.

DESCRIPTION OF THE PREFERRED EMBODIMENT

Referring briefly to the FIGURE, a molten carbonate electrolyte fuel cell system is shown as illustrating an embodiment of the present invention. Desulphurized natural gas fuel is delivered to the system through conduit 10. A moist anode effluent recycle stream is provided by recycle conduit 12. Fuel is mixed with the recycle stream and is pumped by a pump 14 to a fuel preheater 16 where the mixture is regeneratively heated to about 1,000° F. The mixture is then ducted to the fuel cell 20 having an anode compartment 18 which is packed with a suitable nickel catalyst 22 to promote the, in situ, steam-reforming reaction of the natural gas fuel. Within the anode compartment 18, the natural gas fuel is reformed to the individual constituents of hydrogen, carbon dioxide, carbon monoxide, and certain residual water and methane. The fuel cell 20 comprises essentially an anode 24 and a cathode 26. The anode and the cathode are disposed in fluid communication by an electrolyte 28 which is typically an alumina matrix saturated with an electrolyte containing lithium, potassium and sodium carbonates. At room temperature the electrolyte is a hard ceramic. A preferred electrolyte mixture contains approximately 70 percent by weight carbonate and 30 percent by weight matrix material. At operating temperatures of about 1,300° F., the electrolyte is in liquid form and is held by the matrix.

The molten carbonate system operates on reformed fuel directly and no separator or intermediate chemical reaction is required to purify the fuel supply. Typically, the anode 24 consists of a hand-felted fiber nickel of about 20 percent density. The anode reaction, shown by the equation:

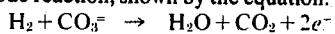

$$H_2 + CO_3^= \rightarrow H_2O + CO_2 + 2e^-$$

produces water which is evaporated into the fuel gas stream as a vapor. The high-temperature operation of the molten carbonate cells vaporizes the product water so that water management within the electrolyte is not critical. The reaction water is the source of steam for the reform process. Part of the hydrogen from the reformed fuel supply is consumed at the anode. The hydrogen-depleted anode effluent leaves the anode compartment at about 1,300° F. and is ducted to a regenerative heat exchanger 30 and cooled to about 180° F. The anode effluent then passes through a product exchange device 32 in which substantially all of the carbon dioxide and a portion of the product water produced in the reform and anode reactions are removed. In the product exchange device anode effluent, after passing through the regenerator 30, enters the chamber 42 through the port 44. The chamber 42 is defined by the wall 46 and the separator 48. As anode effluent passes through the chamber 42, substantially all of the carbon dioxide and a portion of the steam therein is absorbed by the separator 48. Thereafter the anode effluent is ducted through the conduit 12 to the pump 14 where fresh fuel is added to the system.

Air enters the chamber 50 through the port 52. The chamber 50 is defined by the wall 54 and the separator 48. As air passes through the chamber 50 in counterflow fashion to the anode effluent flowing through the chamber 42, carbon dioxide and water are evolved to the air due to the low partial pressures of carbon dioxide and water in the airstream. The carbon dioxide and water-laden air then passes through the regenerator 30 and then into the cathode compartment. The separator 48 may be a porous matrix such as asbestos, porous nickel or porous plastics. The separator may be supported by spacers 54 and 56 to provide resistance to external shock. A product exchange device is more completely described in a copending application having U.S. Ser. No. 728,737 of Calvin L. Bushnell, having a filing date of May 13, 1968 and assigned to the assignee of the present invention.

Air is countercurrently provided through inlet 34 to the product exchange device 32 where carbon dioxide and water, which have been removed from the anode effluent, are transferred to the airstream. Carbon dioxide must be supplied with the air to the cathode compartment. In conventional systems, it is known to mix carbon dioxide from the reformer burner exhaust with the air supply to the cathode compartment. Thus, provisions are made to supply a relatively high concentration of carbon dioxide at the cathode and to remove carbon dioxide from the fuel electrode. The air-gas mixture is ducted to the regenerator 30 where the airstream is heated up to about 1,100° F. This stream is fed to the cathode compartment 36 where some oxygen and carbon dioxide are consumed in the electrochemical reaction. The cathodic reaction, shown by the equation:

$$CO_2 + \tfrac{1}{2} O_2 + 2e^- \rightarrow CO_3^=$$

requires a mole of carbon dioxide and one-half a mole of oxygen for each mole of hydrogen converted at the anode. The cathode effluent is then fed to the fuel preheater 16 where heat is removed from the cathode effluent to preheat the recycle and fresh fuel stream. Thereafter the cathode stream is exhausted from the system through conduit 38.

As may be seen in the FIGURE, electrons are generated at the anode 24 and are made available to the cathode 26 through the external load circuit 40. Located within the anode compartment 18 is a nickel catalyst 22 in particle form. Cell heat provides the necessary energy to steam reform the hydrocarbon fuel in the anode compartment. The conversion of the hydrocarbon fuel is effected in close proximity to the anode so that hydrogen formed is simultaneously consumed at the anode to drive the equilibrium to favor increased hydrogen production.

As fuel cell temperature decreases from its maximum power value of 1,300° F., the process airstream can be decreased to maintain temperature. At the same time the cell temperature is not allowed to drop below approximately 1,200° F., to insure high cell performance. Generally, the fuel cell temperature is maintained at around 1,300° F. To maintain temperature, an auxiliary burner can be connected to the cathode inlet to maintain cell temperature at part-load operation. Sufficient fuel cell waste heat is available from the fuel cell at the design load and operating conditions to provide the necessary heat requirements for the reform reaction in the anode compartment. By utilizing cell waste heat for the reforming reaction, the system efficiency is greatly improved and system efficiencies of 55 to 60 percent may be achieved. Since water vapor is produced at the anode only, a portion of this water vapor can be recycled to the anode inlet to provide the necessary steam for reforming the natural gas fuel. Thus, the need for equipment to condense and reboil the product water vapor is unnecessary and the heat required for boiling may be used for other purposes. In the conventional fuel cell, reaction water is reclaimed in a condenser and stored. The recycling of a high proportion of the hydrogen in the anode effluent maintains a high hydrogen average partial pressure in the anode compartment leading to improved cell performance. It is desirable to maintain the hydrogen partial pressure in the anode compartment in the range from 5 to 7 p.s.i.a.

While this system is shown as having an internal reformer, it is apparent that an external reformer can be utilized. Such a system could also use fuel cell waste heat in the reforming reaction.

Although the invention has been shown and described with respect to a preferred embodiment, it should be understood by those skilled in the art that various changes and omissions in the form and detail may be made therein without departing from the spirit and the scope of the invention which is to be limited and defined only as set forth in the following claims:

We claim:

1. A high-temperature internal reforming fuel cell having an anode, a cathode and a molten carbonate electrolyte including:
    an anode compartment receiving fuel for the anode, the anode compartment having a catalytic substance for the in situ steam reforming of a hydrocarbon fuel where the heat required to reform the fuel is fuel cell waste heat;
    a product exchange device receiving the anode effluent consisting essentially of hydrogen, carbon dioxide and steam, the device transferring substantially all of the carbon dioxide and a portion of the steam continuously from the anode effluent to the countercurrent cathode air supply flowing therethrough;
    a recycle conduit directing the anode effluent from the product exchange device to the anode compartment including means for adding the hydrocarbon fuel;
    a cathode compartment receiving the carbon dioxide and steam-enriched air supply from the product exchange device and a conduit exhausting the effluent from the cathode compartment.

2. A fuel cell as in claim 1, including a regenerator disposed between the fuel cell and the product exchange device to cool the anode effluent and heat the cathode air supply.

3. A fuel cell as in claim 2, where the hydrocarbon fuel is methane and the catalytic substance is nickel or supported nickel particles.

4. In a high-temperature fuel cell operating at about 1,300° F., the cell having an anode, a cathode and a molten carbonate electrolyte, the method of operating the cell comprising;
    steam-reforming methane fuel in the presence of a catalyst in the anode compartment, the reforming energy being provided by cell waste heat;
    transferring continuously essentially all of the carbon dioxide and a portion of the water in the anode effluent to the countercurrent flow cathode airstream in a product exchange device;
    recycling the remaining anode effluent and adding methane to the recycling stream in an amount sufficient to maintain the hydrogen partial pressure at about 5-7 p.s.i.a. in the anode compartment;
    directing the carbon dioxide and water-enriched air supply to the cathode compartment; and
    disposing a regenerator between the fuel cell and product exchange device for the purpose of cooling the anode effluent and heating the cathode-enriched air.

5. The method of claim 4, including the step of:
    preheating the fuel supply and cooling the cathode exhaust.